Oct. 30, 1962 M. J. TITTES 3,061,323
TWO-WHEEL HAND TRUCK WITH STAIR WALKING MECHANISM
Filed July 15, 1960 3 Sheets-Sheet 2

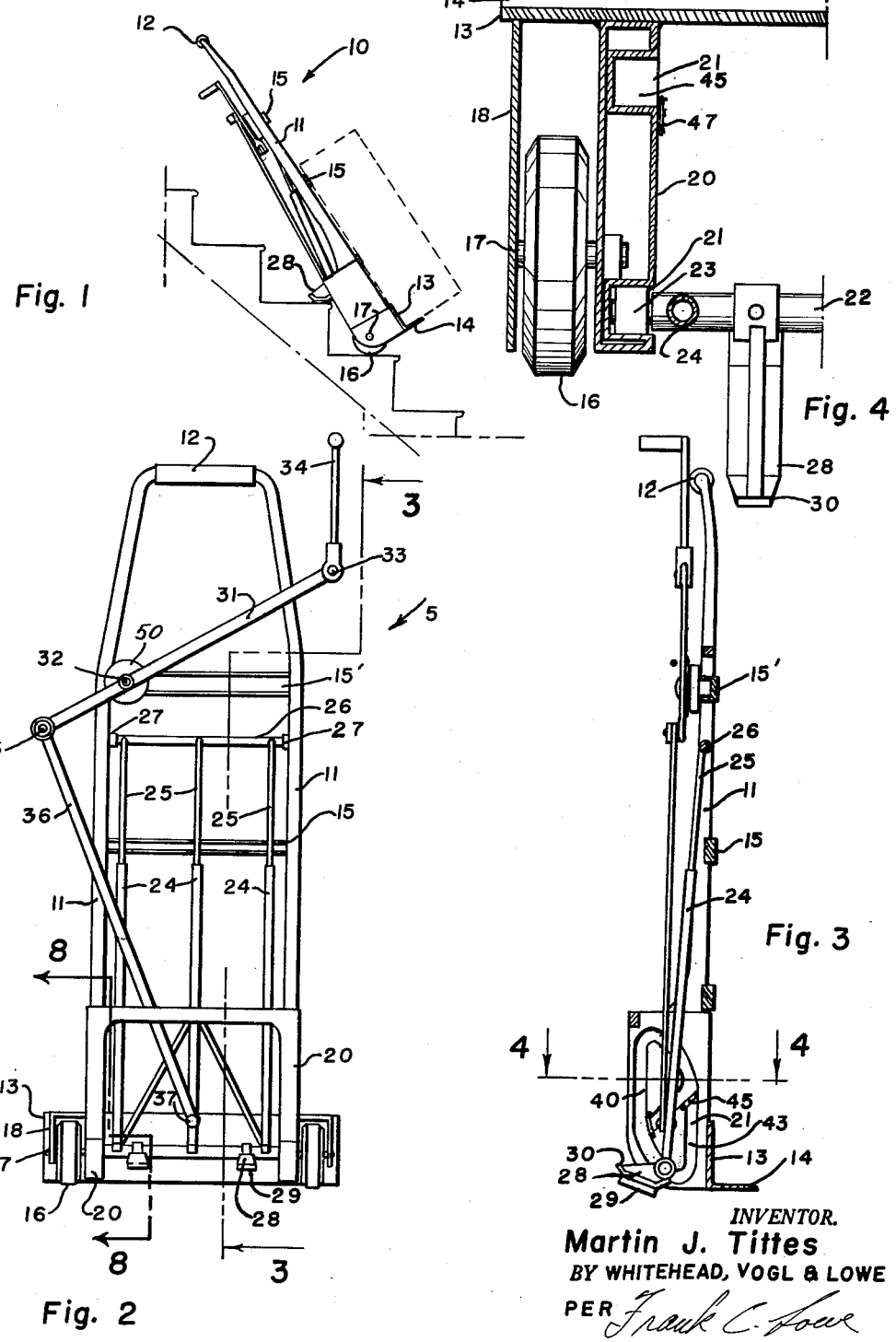

INVENTOR.
Martin J. Tittes
BY WHITEHEAD, VOGL & LOWE
PER Frank C. Lowe
ATTORNEYS

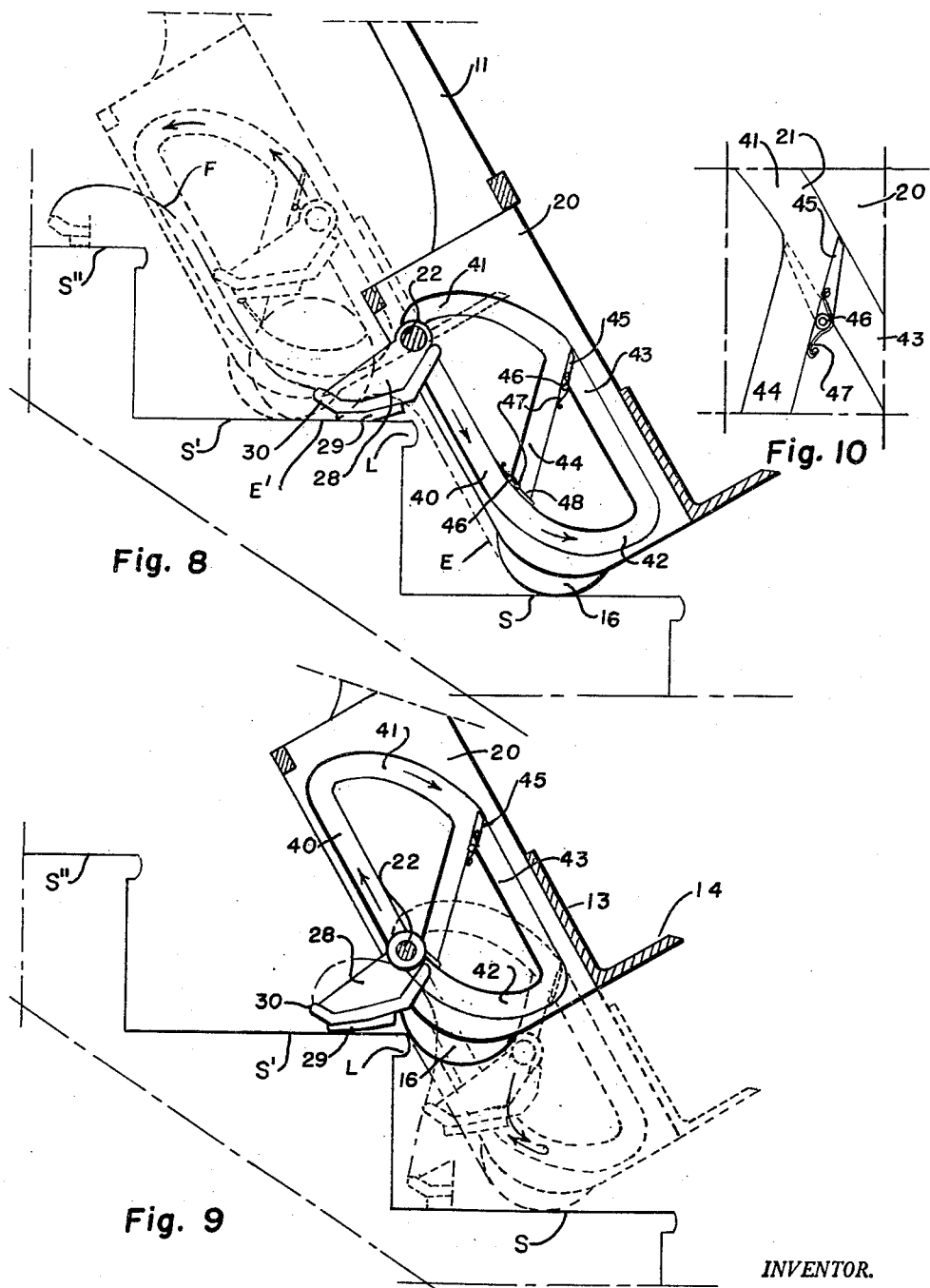

United States Patent Office 3,061,323
Patented Oct. 30, 1962

3,061,323
TWO-WHEEL HAND TRUCK WITH STAIR
WALKING MECHANISM
Martin J. Tittes, 1132 Marion St., Denver 8, Colo.
Filed July 15, 1960, Ser. No. 43,239
10 Claims. (Cl. 280—5.3)

This invention relates to hand carts or trucks and more particularly to a two-wheel hand truck of the general type which is formed as a flat frame having a handle or handles at one end thereof and being supported on a pair of wheels near the other end to carry a load thereon when the frame is inclined. As such the apparatus will be hereinafter referred to as a two-wheel hand truck or simply as a hand truck, a primary object of the invention being to provide a novel and improved two-wheel hand truck which is especially for use on stairways.

Another object of the invention is to provide a novel and improved two-wheel hand truck which is adapted to wheel a load across a flat floor surface in a conventional manner and is further adapted to walk a load up or down a stairway as a regular operation in the use of the truck.

Another object of the invention is to provide a novel and improved stair-walking mechanism for a two-wheel hand truck which is adapted to walk a loaded truck either up or down a stairway with comparative ease and without bouncing, jostling or losing balance of the load and without the truck striking or otherwise abusing the edge lips of the stair treads.

Another object of the invention is to provide a novel and improved stair-walking mechanism for a hand truck which is adapted to extend from the underside of the truck to walk it up and down a stairway when a mechanism is needed but to be retracted and out of the way when the mechanism is not needed.

Yet another object of the invention is to provide a novel and improved stair-walking two-wheel hand truck which is especially adapted to permit a single man to handle bulky and moderately heavy articles, such as stoves and refrigerators, and to move such articles across floor surfaces and also up and down stairways without imposing undue strain upon the man and without the need or assistance of a second man.

Yet other objects of the invention are to provide a novel and improved stair-walking two-wheel hand truck which is a simple, easily-built, low-cost versatile, rugged, reliable and durable unit and which substantially reduces the cost of material handling.

With the foregoing and other objects in view, all of which more fully hereinafter appear, my invention comprises certain improved constructions, combinations and arrangements of parts and elements as hereinafter described, defined in the appended claims and illustrated in preferred embodiment in the accompanying drawing in which:

FIGURE 1 is a side elevation view of the improved truck illustrating it as carrying a load and as being walked up or down a stairway in accordance with the principles of the invention.

FIGURE 2 is an elevational view of the rear or underside of the truck.

FIGURE 3 is a longitudinal section of the unit as taken substantially from the indicated line 3—3 at FIG. 2.

FIGURE 4 is a fragmentary sectional detail as taken substantially from the indicated line 4—4 at FIG. 3, but on an enlarged scale.

FIGURE 8 is a fragmentary sectional detail as taken substantially from the indicated line 8—8 at FIG. 2 but on an enlarged scale and with the unit on a stairway and diagrammatically illustrating, with broken lines, the manner in which the unit is walked up a stairway.

FIGURE 9 is a similar view of FIG. 8 but illustrating the manner in which the unit is walked down a stairway.

FIGURE 10 is a fragmentary portion illustrating specifically a gate construction as taken from the indicated arrow 10 at FIG. 5 but on an enlarged scale.

Figures 5, 6, 7:
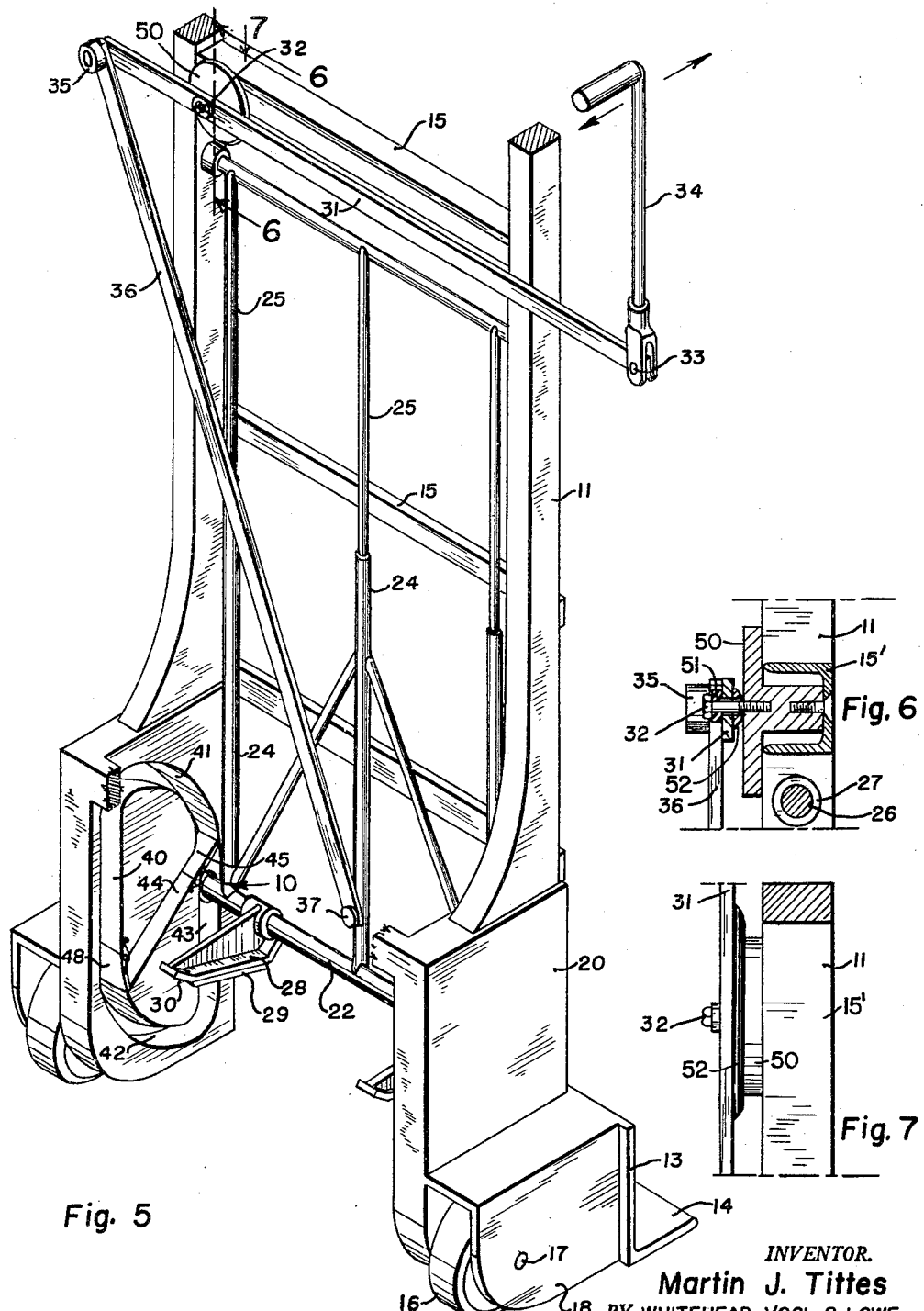
FIGURE 5 is an isometric, rear view of the unit as taken from the indicated arrow 5 at FIG. 2, but on an enlarged scale and with the operative elements being at a different position.
FIGURE 6 is a fragmentary sectional detail as taken substantially from the indicated line 6—6 at FIG. 5.
FIGURE 7 is a fragmentary detail as viewed substantially from the indicated arrow 7 at FIG. 5.

While the use of a hand truck for material handling is common in many industries, a major use is for the delivery of appliances, such as refrigerators and washing machines, to a consumer's home. These appliances will usually weigh from 150 to 300 pounds and are usually too bulky to be easily handled without a hand truck. However, while a two-wheel hand truck will easily move such an appliance across the level surface, it is no good for moving the appliance up or down a stairway. Practically every appliance delivery is to a house having stairways and it is necessary to use at least two men for the delivery job although a single man can easily handle the appliance with the assistance of a two-wheel truck everywhere except at the stairway. The additional man must be on hand to assist in moving the appliance up or down the stairway even though only two or three steps may be involved. The wheels of a conventional hand truck are not adapted to follow the risers and treads of the stairway and considerable tugging and straining is required even with two men. With such in view the present invention was conceived and developed and comprises, in essence, a two-wheel hand truck having lever-actuated climbing feet at its rear underside which may project outwardly and shift longitudinally in the manner adapted to lift the truck upwardly or ease it downwardly on a stairway or to move it from one step to another as now set forth in detail.

Referring more particularly to the drawing, the stair-climbing two-wheel hand truck comprises a flat frame 10 which is conventional in form, modified only to accommodate those elements which constitute the essence of this invention. The frame 10 includes a pair of longitudinally disposed side bars 11 which generally lie in spaced parallelism and extend from one end of the truck to the other. The upper ends of these side bars 11 are turned inwardly to come together to form a transversely disposed gripping hand bar 12 and the base ends of the bars are interconnected by a transversely disposed angle bar 13 having a base leg lying flatly against the side bars 11 and the other leg outstanding from the bottom edge of the frame as a conventional lift lip 14. Several transverse cross bars 15 are located along the side bars to complete the frame 10 mechanism.

In order to accommodate the stair-walking mechanism between the side bars 11, the truck wheels 16 are mounted on short, individual shafts 17 at the outer side of the side bars 11 with the inner ends of the shafts 17 being supported by frame elements and the outer ends of the shafts being supported by the skirts of wheel covers 18. Each wheel cover is an angle member extending outwardly from a side bar to be over its wheel and extend downwardly therefrom as a side skirt. The forward end of each cover 18 abuts against the base leg of the angle bar 13 and in combination with the side bar 11 element and bar 13 forms a structurally rigid pocket. This pocket is open at the base and at the rear side of the truck to expose the wheel 16 which extends below and at the backside of its pocket to support the truck when it is tilted and is being moved over a flat surface such as a floor in a conventional manner.

The stair-walking mechanism lies between the side bars 11. To accommodate this mechanism, the base end of each side bar 11 is increased in depth to form a substantially-rectangular cam box 20 which is suitably proportioned in height, depth and thickness to provide for a generally oval-shaped cam path 21 at its inner face. Each cam path 21 is essentially a rectangular groove which lies in spaced opposition to a similar cam path 21 of the opposing cam box 20. A transversely disposed follower-shaft 22 lies between the opposing cam boxes, and each end of this shaft rides in the groove of a cam path. To eliminate friction, a small roller bearing 23 is mounted upon each end of the shaft 22 and lies within the cam path 21 to minimize the frictional resistance of movement of the follower shaft 22 about the cam path as hereinafter described.

It is essential that this follower shaft 22 move in and about the opposing cam paths in a fixed position which is always transverse to the longitudinal axis of the unit with the axis of the shaft defining generally, the surface of an irregular cylinder having the form of the cam path. Also, it is essential that the shaft be non-rotatable to carry lifting feet hereinafter described. To accomplish this, three longitudinally-disposed tubes 24 are secured in spaced-apart positions to the follower shaft to lie in mutual spaced parallelism and extend upwardly and generally between the side bars 11 to lie back of the cross bars 15. Three cylindrical rods 25 are telescopically carried in the tubes 24 with their extending ends being connected to a transversely disposed pivot bar 26 which lies between and is mounted in the side bars 11. The ends of this pivot bar are mounted in suitable sockets 27 in the side bar members 11 to permit partial rotation of the pivot bar 26 therein.

With this arrangement, the guide tubes 24 must always be directed toward the axis of the transverse pivot bar 26. However, while the distance the follower shaft 22 and the pivot bar 26 will vary by telescoping action of rods 25 into and out of the tubes 24, the follower shaft will always remain in the same transverse alignment and it will rotate only to that slight extent caused by rocking of the pivot bar 26 when the carrier bar moves from one position to another position in the cam paths.

A pair of feet 28 is affixed to the follower shaft 22 to outstand rearwardly from the frame 10 and beyond the rear edges of the cam boxes 20. These feet are suitably spaced apart to provide for lateral stability when resting upon a stair step. Also, they are inclined upwardly with respect to the frame to permit them to rest flatly upon the stair step when the truck is tilted as when it is carrying a load as illustrated at FIG. 1. To protect the stair steps the underside of the feet are padded as at 29 and to allow for excess tipping of the truck when it is on a stairway the outer ends of the feet are turned upwardly as at 30.

The follower shaft 22 is forcibly moved about the cam path by a suitable, manually operated lever system and this moves the feet in a corresponding manner as hereinafter described. In the construction illustrated, the lever system includes a lever arm 31 which is connected to a pivot 32 at the back side of a crossbar 15' near the gripper handle 12 of the truck. This connection is at an intermediate position on the arm 31 with both ends of the arm being adapted to move by rotation of the arm about the pivot 32. The lever arm 31 lies generally across the backside of the truck and one end thereof extends laterally beyond one side of the truck frame 10 and terminates as a pivot 33 to carry a pull-handle 34, in a general longitudinal direction to a convenient position which is adapted to extend for gripping by the operator. He may grip and pull this handle 34 with one hand while he holds the truck in balance by gripping the hand bar 12 with the other hand. The other end of this lever 31 is located at the opposite side of the truck frame 10 and is connected by a pivot 35 to a link 36 which extends generally downwardly along the underside of the truck to a connecting pivot 37 on the center tube 24 adjacent to the follower shaft 22. It follows that an upward movement of the handle 34 with respect to the frame 10 is accompanied by a downward movement of the other end of the lever arm 31 of the link 36 and of the follower shaft 22 in the cam path 21. Thus, when the feet are resting upon a stair step S, the upward movement of the handle 34 is accompanied by a lesser upward movement of the frame 10 with respect to the fixed position of the feet.

The cam path 21 must permit such movement of the truck up or down a stairway with the lever-actuated feet in a manner which insures a safe and reliable operation of the truck and at the same time avoids scraping, bumping or otherwise abusing the steps of the sairway. In the first place, it is necessary for the feet to be extended rearwardly of the cam boxes when they are being used but to be retracted between the cam boxes when they are not being used and when they are being shifted from one step to another. Also, when walking up a stairway it is necessary to lift the truck wheels from one step to another in a manner which clears the lip of the steps. The wheels are preferably lifted above the upper step and then placed on the step at a substantial distance back of the lip of the step in a safe and secure position before the feet are moved to an upper step. On the other hand, when the truck is walking down the stairway, the preferred operation is quite different. It is desirable for the feet to rest upon a stair step and begin to hold the weight of the truck and its load as the wheels of the truck edge over the lip of the stair step to drop to the lower step.

To perform these several operations the cam path 21 in the cam box at each side of the truck is circuitous and is roughly oval in form. Operationally, it may be described as being divided into several reaches with a primary lifting reach 40 being a generally straight portion of the path which is parallel to the longituduinal axis of the truck and is located near the back edge of the cambox 20. When the follower shaft lies in this reach 40, the feet 28 extend rearwardly of the cam boxes 20 in a position for contacting stair steps when the truck is properly tilted as illustrated at FIGS. 1, 8 and 9. The length of this lifting reach 40 is sufficient to move the truck, upwardly or downwardly, from one step to another when the follower shaft 22 moves in this reach from one end to another.

The upper end of the lifting reach 40 turns to form an upper retracting reach 41 and the lower end of the lifting reach 40 turns to form a lower retracting reach 42. Each retracting reach is suitably arched to provide for smooth operation and each reach is generally horizontal in direction when the truck is properly tilted as to carry a load. These retracting reaches extend substantially across the cam box 20 near the forward side thereof and at a distance sufficient to withdraw the feet 28 between the cam boxes and out of position for contacting stair steps and their forward ends are interconnected by a return reach 43 which lies substantially parallel with the lift reach 40. This return reach 43 is used only for walking the truck up a stairway, as hereinafter described, or for retaining the follower shaft 22 when the stair-walking elements are not in use. To complete the cam path 21, a bypass reach 44 is extended from the forward or retracted end of the upper retracting reach to the lower end of the lifting reach 40. This bypass reach 44, is used in walking the truck down a stairway as hereinafter described.

Directional gates control the movement of the follower shaft in the cam paths 21 and assure its movement in the proper reaches. One directional gate 45 is located in the return reach 43 immediately below the entrance of the bypass reach, and this gate permits the follower shaft 22 to move upwardly in the return reach 43 and into the upper retracting reach 41, preventing it from dropping into the bypass reach 44. The gate 45 also permits the follower shaft 22, when moving in the opposite direction, to move from the upper retracting reach 41 and into the bypass reach 44, preventing it from dropping into the return reach 43. Referring to FIG. 10, the cam path is bifurcated by these reaches in the general form of an inverted Y, and the gate 45 is mounted on a pivot 46 at the crotch of the bifurcation. A spring 47 normally holds the gate across the retracting reach 41 as illustrated. Another directional gate 48 is located at the lower exit of the bypass reach 44 which is adapted to permit the follower shaft 22 to drop into the lower return reach 42. It also permits the follower shaft 22 to move in either direction from the lower return reach 42 and into the lift reach 40 or vice versa without entering the bypass reach 44. This gate is also mounted in the crotch of the bifurcation of the cam path on a suitable pivot 46 with a spring 47 holding it in a normal position across the lower end of the bypass reach as generally illustrated.

The movements of the follower shaft 22 to walk the truck up a stairway are generally illustrated at FIG. 8, with the truck being shown at an initial position on a lower step S in solid lines preparatory to movements to an upper step S'. The feet 28 are resting upon this upper step S' and the follower shaft 22 is at the upper end of the lifting reach 40. Subsequent lifting movements by moving the follower shaft 22 downwardly in the lifting reach 40, by the lever system hereinbefore described, effects upward movement of the truck, and this upward movement is represented by the dashed line E, the path of the edge of the wheel 16. It is to be noted that this path line E is substantially straight during the movement of the follower shaft in the straight portion of the cam path lifting reach 40 and that this movement takes the wheel edge past the lip L of the step S' without contacting it. As the follower shaft moves into the lower retracting reach 42, the wheel edge does not move upon the step, but it moves above and over the step S' and sets upon the step a substantial distance inwardly of the lip of the step as indicated by the contact point E' with the truck being substantially in its final position as indicated in broken lines. The exact form of the path E may be determined by the general arch shape of the lower retracting reach 42 and the safety feature inherent in placing the wheels 16 upon the step S' away from the lip edge L is obvious.

After the wheel is set upon the step S', the next cycle of the operation is to move the follower shaft through the lower retracting reach to the return reach 43, thence upwardly in this reach to and through the upper retracting reach 41 for placement of the feet 28 upon the next step S" preliminary to further movements of the truck up the stairway. Throughout this movement, the outer edges of the feet 28, indicated by the dashed line F, are away from the lip L of the step S" and the feet may be properly set upon the step S" without any part of the truck contacting or striking the lip L of the step S".

In lowering the truck, as indicated at FIG. 9, the follower shaft 22 is near the bottom of the lifting reach 40, with the feet contacting the surface of the step S' but without pressure against the step. The truck is pushed forwardly and as the wheels commence to roll over the lip L of the step the weight of the loaded truck is transferred to the feet, as when the truck is at the position as indicated in solid lines. The truck is then lowered downwardly with the follower moving in the lift reach 40, and as it approaches the top of the reach the wheels 16 set themselves upon the lower step S with the truck in the position as indicated in broken lines. The movement of the follower is continued to retract and drop the feet 28 to the lower step S. This follower movement thus extends through the upper retracting reach towards the forward end of the truck and thence it drops through the bypass reach 44, past the gate 48 and into a portion of the lower retracting reach 42 to place the feet 28 upon the lower step S. It is to be noted that this return movement of the feet 28 is in such a position that they do not strike the lip L of the stair S. The edging of the truck wheels over the lip of the step S' with the feet taking over when the truck is in the proper position permits the operator to have full control of the operation at all times.

The main forces exerted on the lever system to so lower and raise the truck down or up a step are primarily pulling forces on the handle 34 with the pressure of the link 36 acting on the follower shaft 22 in the general direction of the lifting reach 40 and the return reach 43. However, the direct action of this lever system is not fully effective to shift the follower shaft 22 across the retracting reaches 41 and 42 since the movement across these reaches is generally normal to the direct lever action. In placing the truck upon a step when walking up a stairway as to point E', the weight of the loaded truck will naturally move the follower shaft 22 through the lower retracting reach, but other movements to shift the follower shaft across these reaches must be accomplished manually.

To accomplish these shifting movements the lever arm 31 is mounted loosely upon the pivot 32 with the arm abutting against a flat restraining disc 50 at the base of the pivot 32, and being held there, against the base, by a rubber washer 51. The underside of the arm, adjacent to the disc 50 includes a rounded portion 52 which contacts the disc 50. With this arrangement, the arm 31 is restrained in its movement to a plane parallel with the surface of the restraining disc 50, but is free to rotate through a small arc about its longitudinal axis. Such axial rotation may be easily effected by lateral pulling or pushing of the handle 34 as in the direction of the indicated arrows adjacent to the handle at FIG. 5. Such pulling and pushing of the handle effects inward and outward movements of the lever system to shift the follower shaft across the upper or lower retracting reaches 41 and 42 as in the direction of the indicated arrows at FIG. 5 adjacent to the follower shaft 22.

From the foregoing description, it is obvious that an operator will quickly and easily learn to use this apparatus to his best advantage in moving a loaded truck up and down a stairway. It is also obvious that variations of the construction which is illustrated and described are possible, but that such variations will, nevertheless be within the spirit and scope of my invention. Hence, it is my desire that my protection be limited, not by the constructions illustrated and described, but only by the proper scope of the appended claims.

I claim:

1. In combination with a two-wheel hand truck formed as a longitudinally disposed body having a gripping handle at the top end and a pair of wheels at the base end thereof and being adapted to carry a load when tilted, a stair-walking lift means at the back side of the truck adjacent to the base end thereof and including, a gripping foot adapted to extend from the back side of the truck body as to rest upon a stair step when extended, a follower means supporting the gripping foot, a circuitous cam path in the truck body having a lifting-reach portion adjacent to the back side of the truck, a retracting reach at each end of the lifting reach and a return reach within the truck body, wherein the follower means may move to shift the foot longitudinally along the back side of the truck with the gripping foot being extended as when being in the the lifting reach, to retract and extend the foot, as when being in the retracting reaches and to shift the foot longitudinally within the truck body with the gripping foot retracted as when being in the return reach, and lever means adapted to forcibly move and permit controlled movement of the follower along the cam path as when the truck is tilted, to extend the foot onto a stair step to permit the truck to be moved, selectively, upwardly and downwardly therefrom, to retract the foot from a stair step as when the truck wheels are resting upon a step, to move the foot, selectively, downwardly and upwardly from succeeding stair steps, when retracted, and to extend the foot for contact with a next-succeeding stair step.

2. In combination with two-wheel hand truck formed as a longitudinally disposed body having a gripping handle at the top end and a pair of wheels at the base end thereof, and being adapted to carry a load when tilted, a stair-walking lift means at the back side of the truck adjacent to the base end and including, a gripping foot adapted to extend from the back side of the truck body as to rest upon stair step when extended, a follower means supporting the foot, cam path in the body having a lifting-reach portion wherein the follower means may move to shift the foot longitudinally along the back side of the truck in an extended position, a retracting reach at the base of the lifting reach wherein the follower means is adapted to move to retract the foot from its extended position and to a retracted position within the body and a return reach from the inner end of the retracting reach within the body and to the top of the lifting reach, and lever means adapted to forcibly move and permit controlled movement of the follower along the cam path when the truck is tilted onto the foot, with the foot being in an extended position and on a stair step, said lift reach extending to the base extremity of the truck body and said follower means being adapted to extend the foot below the base end and wheels of the truck when being moved to the base of the lifting reach whereby to lift the truck and wheels thereof above and over the foot as the follower means moves from the lifting reach and to the retracting reach as when the truck is moving upwardly and onto a step with the wheels clearing the lip of the step and being placed toward the center portion of the step and away from the lip.

3. In combination with two-wheel hand truck formed as a longitudinally disposed body having a gripping handle at the top end and a pair of wheels at the base end thereof, and being adapted to carry a load when tilted, a stair-walking lift means at the back side of the truck adjacent to the base end and including, a gripping foot adapted to extend from the back side of the truck body as to rest upon a stair step when extended, a follower means supporting the foot, a cam path in the body having a lifting-reach portion wherein the follower means may move to shift the foot longitudinally along the back side of the truck in an extended position, a retracting reach at the top of the lifting reach wherein the follower means is adapted to move to retract the foot from its extended position to a retracted position within the body and a bypass reach from the inner end of the retracting reach within the body to the base of the lifting reach, and lever means adapted to forcibly move and permit controlled movement of the follower along the cam path when the truck is tilted onto the foot, with the foot being in an extended position and on a stair step, to permit the truck to be moved upwardly and downwardly as the follower means moves in the lifting-reach portion of the cam path, said retracting reach and bypass reach being adapted to facilitate the movement of a truck down a stairway by retracting the foot from an upper step when the truck wheels are at a lower step and then permitting the foot to move to the lower step by movement for holding contact therewith as the truck is wheeled over the lip of said lower step for downward movement to a further lower step.

4. The organization set forth in claim 1 including a bypass reach interconnecting with the retracted end of the upper retracting reach portion, with the lower end of the lifting reach portion wherein said follower means may move from the upper retracting reach to the bottom of the lift reach for shifting the foot from an upper step to a lower step to walk the truck down a stairway and a directional gate at the top of the return reach permitting movement upwardly from the return reach to the upper retracting reach portion and preventing movement from the upper retracting reach portion to the return reach.

5. In the organization defined in claim 4, a second directional gate at the base of the bypass reach permitting downward movement of the cam means from the bypass reach and preventing upward movement of the cam means into the bypass reach.

6. In the organization defined in claim 1, said follower including a tube attached thereto and extending generally longitudinally under the truck framework, and a rod telescopically inserted into the tube with its extended end being pivotally attached to the truck framework, whereby to permit longitudinal and retraction and extension movements of the tube in the shaft as the follower means moves in said cam path to stabilize the position of the follower and extended foot but to substantially prevent rotation of the follower means about a transvere axis.

7. In the organization defined in claim 1, said lever means including a generally transversely disposed lever arm pivotally mounted at the underside of the truck framework for movement in the plane of the framework, and a link pivotally connecting one end of the lever arm to the follower means, where in the pivotal connection of the lever arm to the framework is loose to permit rotation of the arm about its axis and the pivotal connection of the link to the lever arm is tight to effect movements of the link perpendicular to the normal plane of link movement responsive to an axial twist of the lever arm.

8. In a two-wheel hand truck having a pair of spaced longitudinal frame members, a gripping handle at the top of the members and a pair of spaced wheels at the base of the members, and being adapted to be tilted to carry a load thereon, a stair-walking lift means at the underside of the truck, and including, a widened portion at the base of each frame member for forming a cam box with corresponding, transversely-opposing circuitous cam paths in the boxes, a follower means including a transversely disposed shaft spanning the reach between the boxes with each end being within a cam path, and means for forcibly moving the shaft in the cam paths, a pair of feet outstanding rearwardly from this shaft and being adapted to extend rearwardly from the rear edge of the cam boxes when the shaft is in portions of the cam path near the rear edge of the boxes but to be retracted between the cam boxes when the shaft is in portions of the cam path near the forward edge of the boxes.

9. In the organization defined in claim 8, said cam paths including a lift-reach portion adjacent to the rear edge of the cam boxes where the feet are extended, a retracting-reach portion at each end of the lift-reach portion extending from the lift reach portion towards the forward edge of the boxes, and a return reach adjacent to the forward edge of the boxes interconnecting the forward ends of the retracting reach portions.

10. In the organization defined in claim 8, holding means for holding the shaft including a tube and a rod telescopically mounted therein, with one end of one member being affixed to said shaft to extend generally longitudinally underneath the framework between the longitudinal members and the other end being pivotally affixed to the framework.

References Cited in the file of this patent

UNITED STATES PATENTS

| 1,654,188 | Phillips | Dec. 27, 1927 |
| 1,839,317 | Jankisz | Jan. 5, 1932 |
| 2,192,396 | Burch | Mar. 5, 1940 |